United States Patent [19]

Peddinghaus et al.

[11] 4,051,747
[45] Oct. 4, 1977

[54] METHOD FOR MAKING A TOOL ELECTRODE FOR ELECTRICAL DISCHARGE MACHINING

[75] Inventors: Günther Peddinghaus; Harry Neumann; Horst Wittenstein, all of Ennepetal, Germany

[73] Assignee: A.G. fur industrielle Elektronik AGIE Losone b. Locarno, Losone, Switzerland

[21] Appl. No.: 620,304

[22] Filed: Oct. 7, 1975

[30] Foreign Application Priority Data

Oct. 8, 1974  Germany ............................ 2447842
Sept. 26, 1975  Switzerland ...................... 12483/75

[51] Int. Cl.² ............................................. B21K 5/20
[52] U.S. Cl. .................................... 76/107 R; 51/157
[58] Field of Search ............... 76/107 R; 51/58, 59 R, 51/157

[56] References Cited

U.S. PATENT DOCUMENTS

| | | | |
|---|---|---|---|
| 3,465,480 | 9/1969 | Hauserman | 51/58 |
| 3,497,930 | 3/1970 | O'Connor | 51/59 R |
| 3,948,620 | 4/1976 | O'Connor | 51/157 |

*Primary Examiner*—Harold D. Whitehead
*Attorney, Agent, or Firm*—William R. Woodward

[57] ABSTRACT

An over or undersize abrasive master mould is used to form tool electrodes by abrading a workpiece using a circular reciprocatory motion. The master mould is made by a casting process which starts with a preformed model, positive or negative, of the exact shape to be machined by the tool electrodes to be made. Positive and negative castings of the model, one of which castings is abrasive, are subjected to a relative circular reciprocatory motion in an abrading operation to provide the correct under or oversize of the master mould, which is then made directly or indirectly from the abraded casting. Casting apparatus for use in the method comprises a pallette for holding the casting and adjusting devices for ensuring parallelity and correct alignment for the moulding faces and there is also disclosed apparatus for the abrading operation in which an error detection system regulates the amplitude of the reciprocatory abrading movement.

6 Claims, 22 Drawing Figures

METHOD FOR MAKING A TOOL ELECTRODE FOR ELECTRICAL DISCHARGE MACHINING

The invention relates to several methods for producing a tool electrode of the kind used for stock-removing machining methods (spark erosive or electrochemical). Hitherto tool electrodes were usually produced by copy milling, followed by manual precision finishing. The work required to achieve this end is substantial and the quality is not satisfactory. Accordingly, a method was adopted some time ago which permitted better results to be obtained in a shorter time. This method, together with the associated apparatus, is described in the U.S. Pat. Nos. 3,663,785, 3,777,595, the Canadian Patent Specification 147,718 and the U.S. Pat. No. Re, 27,588. The procedure adopted in the known method and apparatus involves the production of the graphite electrode from a graphite block, which is abraded by means of an abrading tool, the abrading tool being subjected to a circulating but non-rotating motion with an adjustable eccentricity and being at the same time moved, by the application thereto of thrust, into the block surface which is to be machined. A circulating but non-rotating motion means herein a motion which does not involve change of orientation of the tool but in which each point on the tool moves in a circular path about a respective centre so that, as a whole, the tool reciprocates backwards forwards and sideways. Due to the circulating but non-rotating motion the shape of the complete graphite electrode is not complementary with respect to that of the abrading tool but the recesses are larger and the residual webs are smaller. The abrading tool must therefore be produced by a method which compensates for this geometrical deviation. This means that the same circulating but non-rotating motion is applied in the reverse sense at some place in the process steps required for the production of the abrading tool. This dispenses with the need for awkward recalculation of all dimensions followed by the production of an enlarged model. The use of the circulating but non-rotating motion in the reverse sense and means for the production and application of the abrading tools are also disclosed in the French Patent Specifications 1,371,185, 1,379,623 (equivalent to the U.S. Pat. No. 3,564,190) and the German Offenlegungsschrift 1,577,080.

As regards the practical application of these methods it is important that sufficient accuracy be maintained in the various forming operations and that the ensuing costs still permit the efficient production of that number of parts which must be considered in practical terms. It is therefore important to ensure the production of abrading tools without requiring excessive machining but by an accurate process and within a time which is of interest to the production process. It has since been found that the methods described in the Patent Specifications are unsatisfactory and the necessary limiting number of parts is obtained with at least 50 electrodes or more, a feature which severely restricts the technological useability.

It is the object of this invention to eliminate the production of intermediate moulds by lengthy and expensive spark erosive machining or by moulding with a moulding sand which binds only after several hours have elapsed and therefore calls for an expensive machine. Process steps and apparatus associated therewith were therefore developed for performing the moulding operation simply and with the aid of simple moulding materials. The claimed method also ensures that auxiliary surfaces (for example burr tracks) can be incorporated in the process for manufacturing the abrading tool so that a further economical advantage can be achieved by the subsequent production of the entire tool in a single stock-removing machining operation. The accuracy of the novel method and apparatus is improved, more particularly by all machining and forming operations being performed on a pallette system which always provides a good dimensional datum and thus ensures further savings in terms of setting-up times and idle times in the manufacturing sequences. Finally, if a high degree of accuracy is required it is possible with the novel method to employ a filing machine which not only has an eccentricity that is adjustable during operation in known manner but also permits controlled adjustment of the said eccentricity. During the filing operation and taking into account any detected dimensional losses in the intermediate moulds the machine can be controlled so that the eccentricity of the circulating but non-rotating motion is controlled within one circulation in accordance with the measured error so that an accurate part is again produced. This problem occurs more particularly when forming parts one of whose dimenions is long in comparison with the other.

According to the invention there is provided a method of machining a tool electrode for use in electrical discharge machining, the method comprising:

a. using a preformed model, of a shape which is the positive or negative replica of a shape which is to be machined by the tool electrode, to produce a positive casting and a negative casting (for example the positive casting) of said shape, one of the castings comprising, at least on its surface which defines said shape, abrasive material and bonding material which holds the abrasive material in place, and other comprising a material which is readily machinable and which is stable as regards retaining a shape to which it is machined;

b. using the said one casting to abrade the other casting by moving the two castings together so that the positive one enters the negative one end, at the same time, applying a relative circulating but non-rotating movement, as defined herein, to the two castings whereby the said other casting assumes dimensions which deviate from what they were before;

c. making use of other said casting (if it is the positive casting, preferably through the intermediate making of a third casting of a low-shrinkage material), for moulding a master mould which, at least on its surface which, allowing for the dimensional deviation, defines said shape, comprises abrasive material and bonding material which holds the abrasive material in place; and d. using the master mould to abrade a workpiece from which the tool electrode is to be made, and hence forming the tool electrode, by moving the master mould and the workpiece together so that one enters the other and, at the same time, applying a relative circulating but non-rotating movement, as defined herein, to the master mould and the workpiece, the amplitude of the circulating but non-rotating movement being adjusted to give predetermined dimensions of the tool electrode in relation to those of said model.

According to another aspect of the method there is provided casting apparatus for use in making a tool electrode for electrical discharge machining, the apparatus comprising a base plate, mounted on a travelling sub-base with at least two guides disposed on said base plate, a second plate being guided on said guides parallel to the base plate; an adjusting device for controlling the displacement of the second plate parallel to the base plate, at least three adjusting devices for adjustment of the parallel position of the base plate with respect to the second plate; the arrangement, on each of the two plates of two centring trunnions for alignment of the position of interchangeable pallettes on which the castings are cast.

According to another apsect of the method, there is provided abrading apparatus for making a tool for use in discharge machining in which apparatus a feed device applies a force to a casting which is to be machined by a circulating, non-rotating abrading motion, whose eccentricity is adjustable during operation, characterised in that the amount of eccentricity is automatically adjusted by a regulating device in dependence on the angular position of the circulating motion so that dimensional corrections are carried out during the abrading operations.

DETAILED DESCRIPTION

Figure 5:
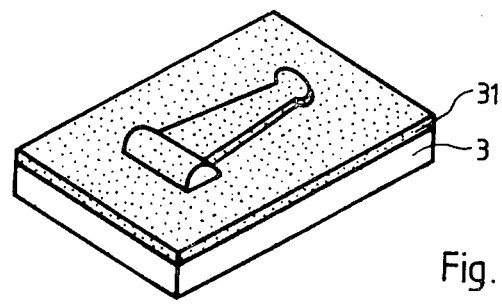
Figure 6:
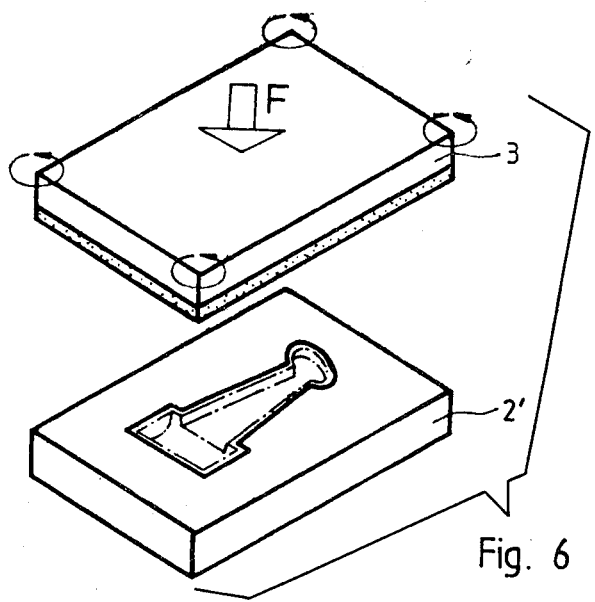
Figure 1A:
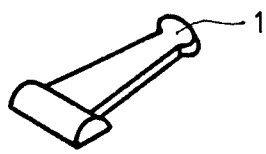

The different methods are compared in the following Table and will be described in detail by reference to the said Table and FIGS. 1 to 9.

casting 2 are identical to those of the pattern 1. The casting consist of a readily machine and form-stable material for example gypsum or the like. The next process step according to FIG. 5 shows a positive casting 3 which is produced from the first negative casting 2. The active surface 31 comprises a mixture of abrasive and bonding medium. This is indicated in FIG. 5 by the dotting of the surface. The next process step is illustrated in FIG. 6 in which the positive casting 3 abrades the geometry of the negative casting 2 under the action of a thrust force F which is applied in the direction of the arrow and while executing a circulating but non-rotating motion which is indicated by circular arrows to produce the abraded casting 2'. The eccentricity (radius) of the circulating non-rotating motion is adjusted in a specific manner and maintained during the entire abrasive operation. A fresh positive casting is produced on the casting 2' during the next process step according to the FIG. 7. As a result of the abrading operation the dimensions of the casting 4 are different from those of the pattern 1. During the next process step according to FIG. 8 a negative casting 5 is produced from the positive casting 4 to function as a master model form. The active surface 51 of the master mould 5 again consists of a mixture of abrasive and bonding medium. During the next process step which is illustrated in FIG. 9 the the master mould 5 is utilized for producing a tool electrode 6 in accordance with the process already described by reference to FIG. 6. The eccentricity for the process step of FIG. 9 is selected in accordance with the eccentricity used for the process step of FIG. 6 and in accordance with the machining gap width required for the discharge machining operation. The succeeding machining operation produces a part having a recess whose dimensions are identical with that of the starting pattern of FIG. 1. Finally, it should be noted that the tool electrode 6 can be constructed of graphite material. The master mould 5 can be used to produce very many tool electrodes 6 with the same dimensions or for pro-

Figure 1:
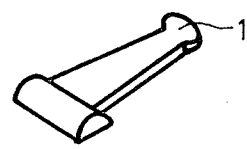
FIGS. 1 to 9 show process steps of four different processes.
Figure 3:
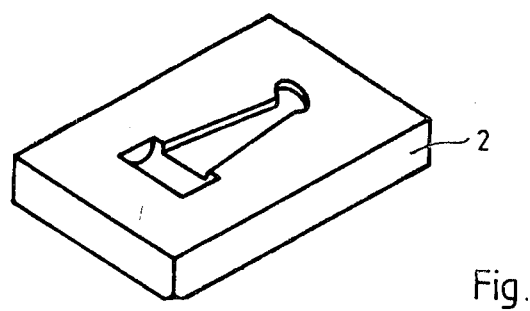
Figure 2:
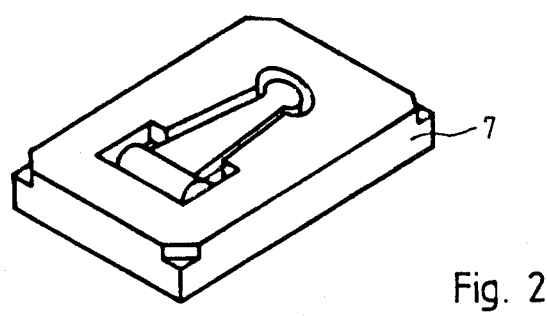
Figure 4:
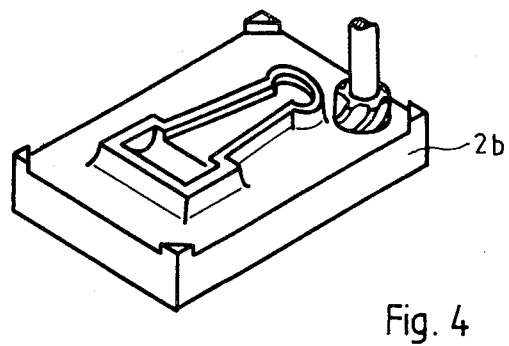
Figure 7:
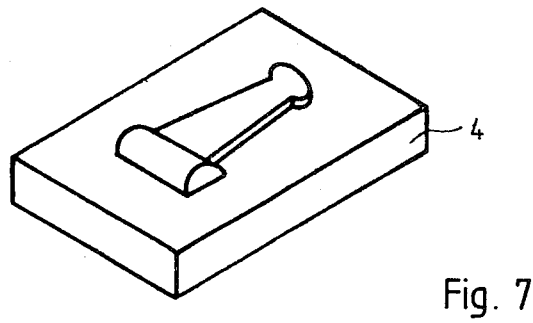
Figure 8:
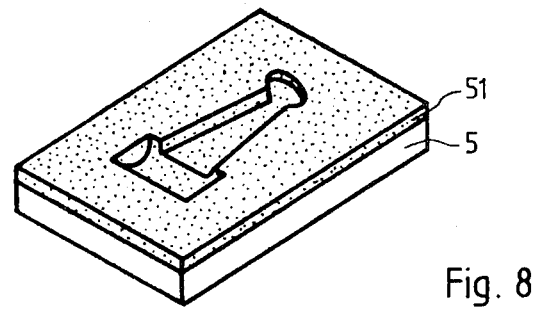
Figure 9:
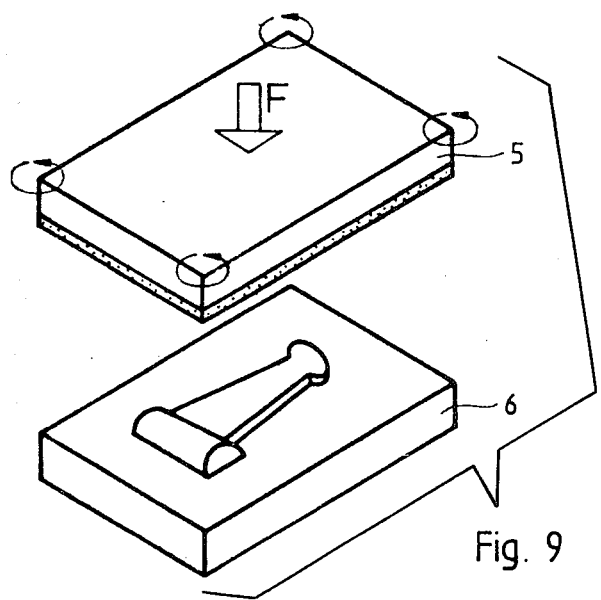
Figure 7A:
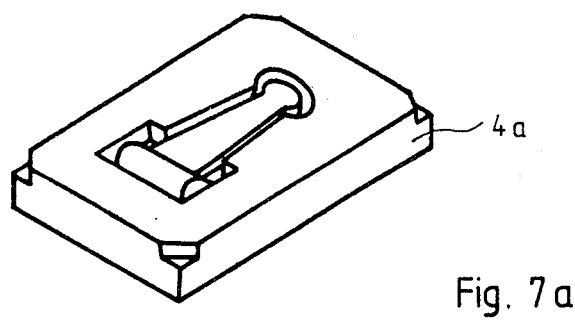
Figure 8A:
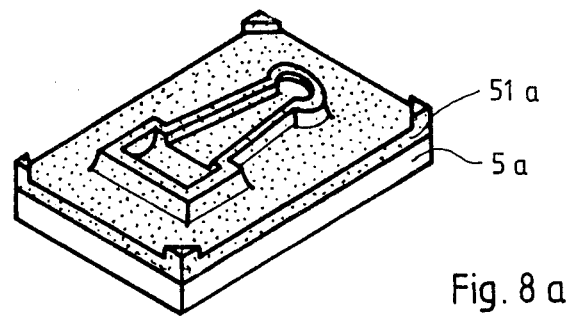
Figure 9A:
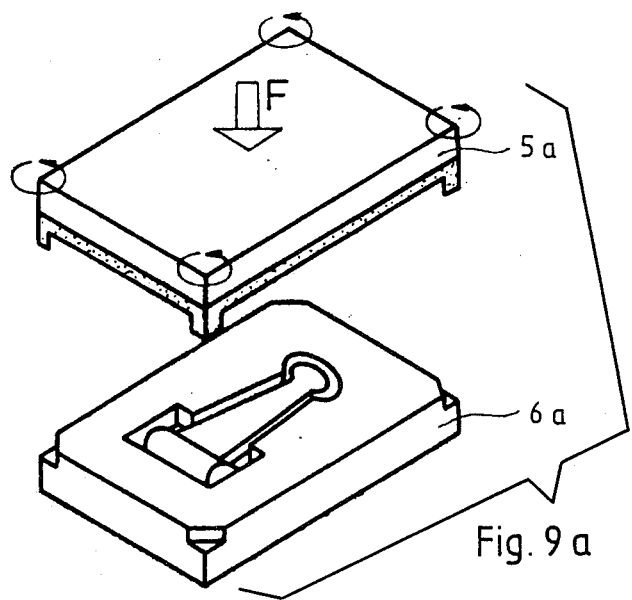

|  |  | Process 1 | Process 2 | Process 3 | Process 4 |
|---|---|---|---|---|---|
| FIG. 1 | starting pattern | X |  | X | X |
| FIG. 2 | sinking in of auxiliary surfaces |  |  |  |  |
| FIG. 3 | 1. casting of identical dimensions 2. form-stable pattern, readily machinable | X |  | X | X |
| FIG. 4 | Machining of auxiliary surfaces on the first casting |  |  |  |  |
| FIG. 5 | second casting as abrading mould, dimensionally identical to first casting | X |  | X | X |
| FIG. 6 | abrading of casting 1 with casting 2 | X |  | X | X |
| FIG. 7 | Third casting with dimensions identical to those of the abraded casting 1 | X | Starting with a pattern which is already dimensionally deformed | X | X |
| FIG. 8 | Fourth casting as abrading mould of identical dimensions on casting 3 | X | X | X | X |
| FIG. 9 | abrading the tool electrodes | X | X | X | X |

A pattern 1 of the workpiece that is to be produced, for esample a body of the shape of a recess to be machined in a production part, is used in the process 1 according to FIG. 1 as the starting mould. In FIG. 1 this model is a body having part of the contour of a stub axle of an automobile that is to fit in a recess of another automobile part.

A first casting tool is produced in the next process step according to FIG. 3. The dimensions of the said ducing several tool electrodes with different undersize dimensions for roughing and finishing machining operations.

The process 2 represents a modified form of the process 1. It commences with a pattern whose dimensions are already modified, i.e. an electrode which was produced at an earlier stage by different means. This pattern can be regarded as the casting 4 (FIG. 7) of the first method. The remaining steps of the proces 2 are then identical to those of the process 1.

Figure 3A:
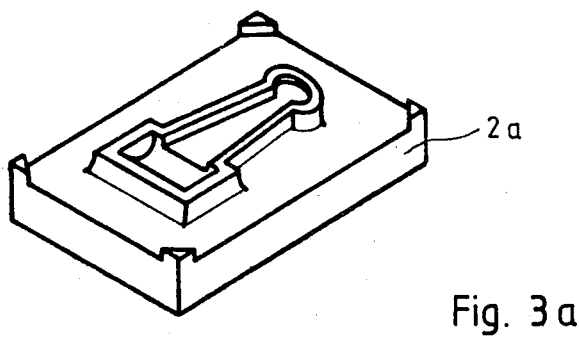

The procedure for another process 3 is illustrated in the Table. It commences as in the first process with the starting pattern according to FIG. 1. However, according to FIG. 2 auxiliary surfaces are first provided around the said pattern 1 as required for subsequent work functions. A negative casting is then produced according to FIG. 3a from the modified pattern 1 to be utilize as the start for performing subsequent process steps 5a – 9a analogy to the process 1.

The other process modification 4 also commences with the starting pattern 1 of FIG. 1 in the same way as the previously described modification. In this case a casting of the kind used in the process 1 is first produced in accordance with FIG. 3. The auxiliary surfaces for subsequent machining sequences are provided in this step on the casting 2' of FIG. 3, for example, by milling, so as to produce the pattern 4 illustrated in FIG. 4. The other process steps then proceed in accordance with the process 3 as shown in FIGS. 5a – 9a.

Figure 10:
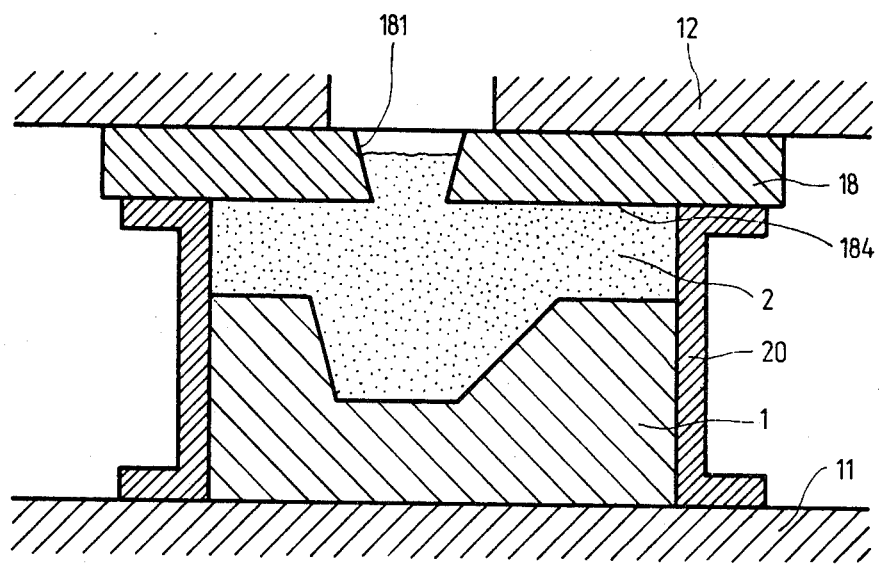
FIG. 10 is a sectional view illustrating the coordination of the casting and pattern.
Figure 5A:
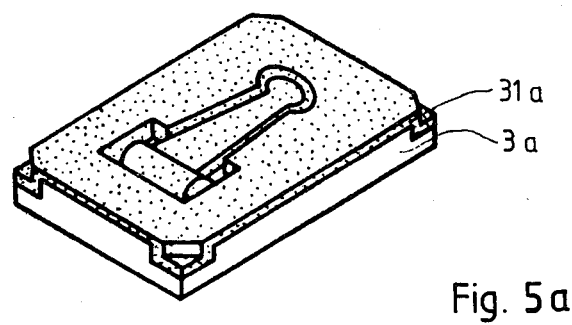
Figure 6A:
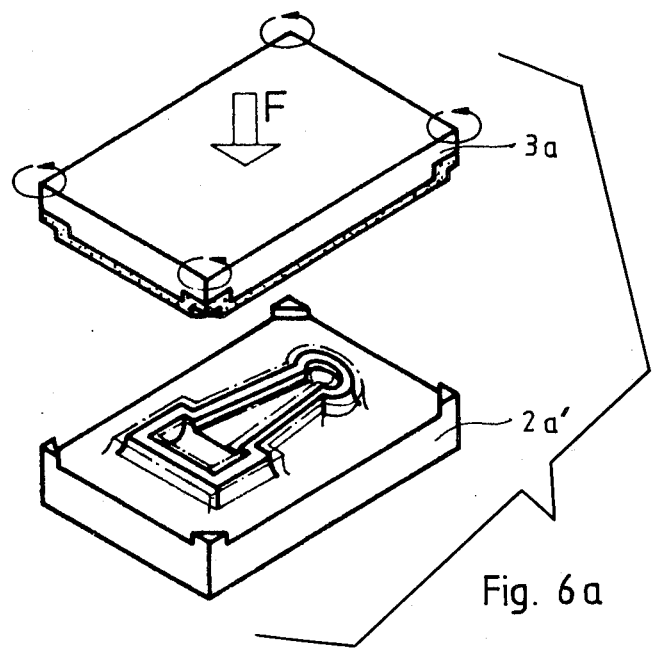

Castings are produced before performing the working steps in all four processes. The principle of these operations is illustrated in FIG. 10. A casting box 20 is disposed between the plates 11 and 12 and contains a pattern 1 or intermediate pattern on which a casting 2 is produced through casting apertures 181 in the casting pallette 18. These operations are performed on the illustrated apparatus which will be described subsequently.

Figure 11:
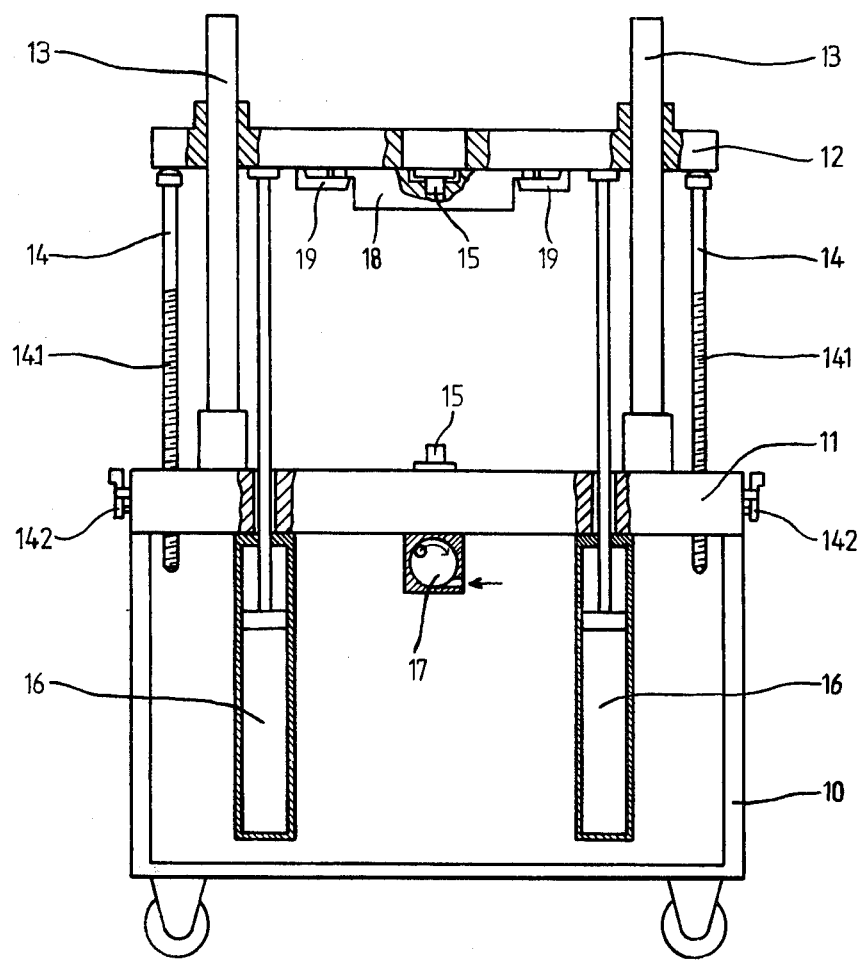
FIG. 11 shows one examplified embodiment of apparatus for performing the casting operation.

A base plate 11 over which a parallel sliding plate 12 is disposed on at least two guiding devices 13 is situated on a sub-base 10, for example a carriage, illustrated in FIG. 11. Mechanical, pneumatic, hydraulic or electrical adjusting means can be used for the vertical adjustment of the plate 12 and such means are preferably disposed in the sub-frame 10 in the same way as the illustrated pneumatic cylinders 16. They are mounted on the fixed base plate 11. At least three adjusting devices 14, which are also adjustably mounted on the base plate 11, are additionally provided for setting the plates precisely parallel for the casting operations. A disengageable ratchet device 142 is preferably employed to reduce idle times so that the adjusting devices can be rapidly lowered into the sub-frame to prevent obstruction but being rapidly available when required for the alignment operation to secure parallelity, this operation being performed with the aid of conventional dial indicators. The screw threading of the adjusting devices is employed for fine adjustment.

Each of the two plates 11 and 12 is provided with two trunnions 15 on which the pallette 18 can be rapidly aligned and interchanged in the precise position. These pallettes are secured by means saddles 19 which are interchangeable and are laterally adjusted with respect to the clamping flanges of the pallettes 18. The said pallettes are secured by means of saddles 19 which can be inserted laterally against the clamping flanges of the pallettes. The casting box which can be closed in sealing type manner and prevents the discharge of the casting material poured therein is applied during the casting operation around the pallettes 18. Casting itself is performed through the casting apertures in the adjustable plate 12 as well as the mounted plates 18. The apparatus may also incorporate an electrically, pneumatically or hydraulically operated vibrator 17 to ensure improved consolidation of the casting material and for degassing purposes.

Figure 12:
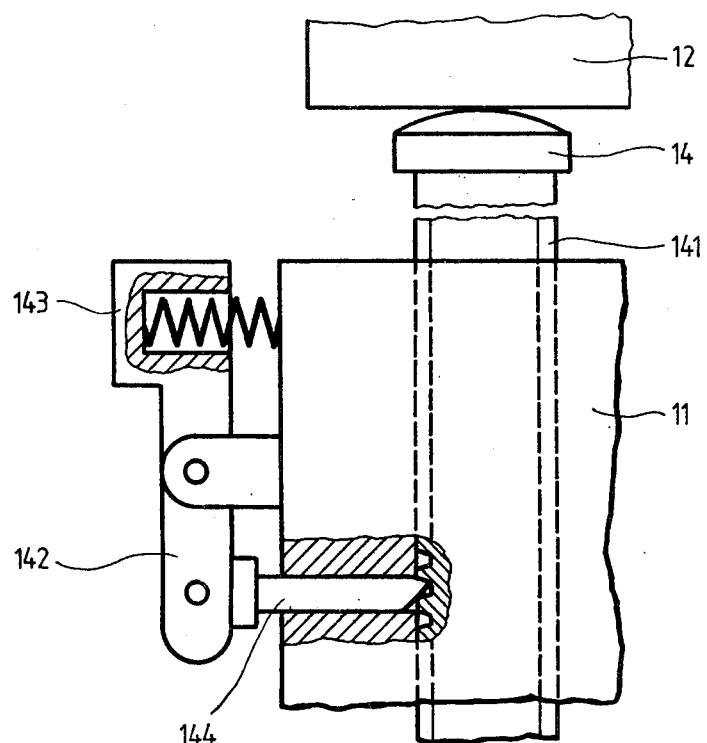
FIG. 12 is a detailed view of one kind of embodiment of the adjusting device for the apparatus of FIG. 11.

One kind of embodiment of devices for adjusting parallelity between plates 11 and 12 is shown in greater detail in FIG. 12. One part of the longitudinal extension of the adjusting device 14 supports the screw threading 141 which cooperates with the ratchet 144 of a ratchet device 142 which can be disengaged against the spring force 143. The adjusting rod can be easily guided in the upward direction to the top plate 12 against the ratchet 144 which locks only in the downward direction. Fine adjustment is then obtained by rotation with respect to the screw threading 141.

Figure 13:
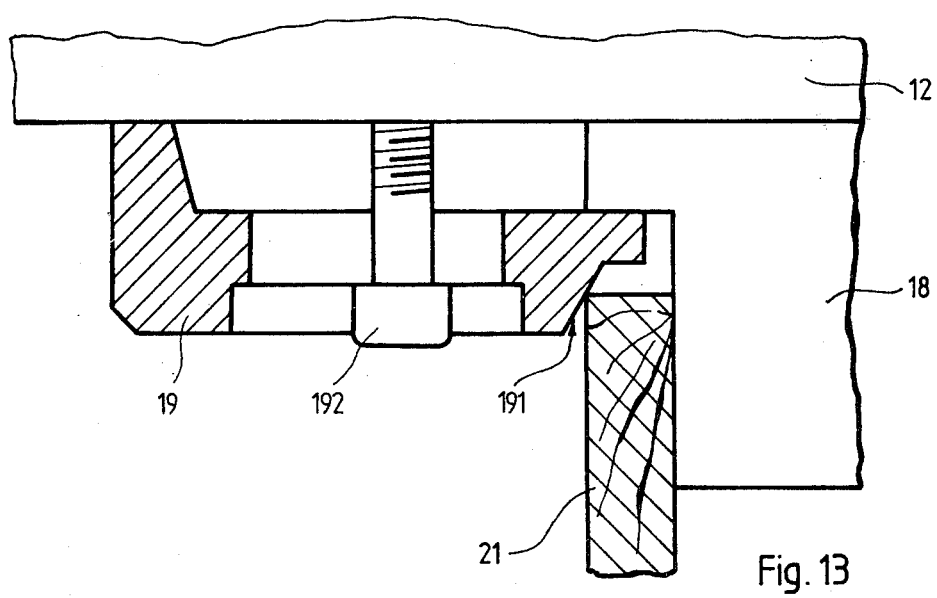
FIG. 13 is a detailed view of one kind of embodiment of the clamping saddle of the apparatus of FIG. 11.

FIG. 13 shows a detail of the manner in which the pallettes are mounted with clamping saddles. Tightening of the screw 192 causes the clamping saddle 19 to apply the actual clamping force on the flange of the pallette 18. The inclined milled portion 191 simultaneously thrust the board to one of the casting box 20 sealingly against the lateral surface of the pallettes.

Figure 14:
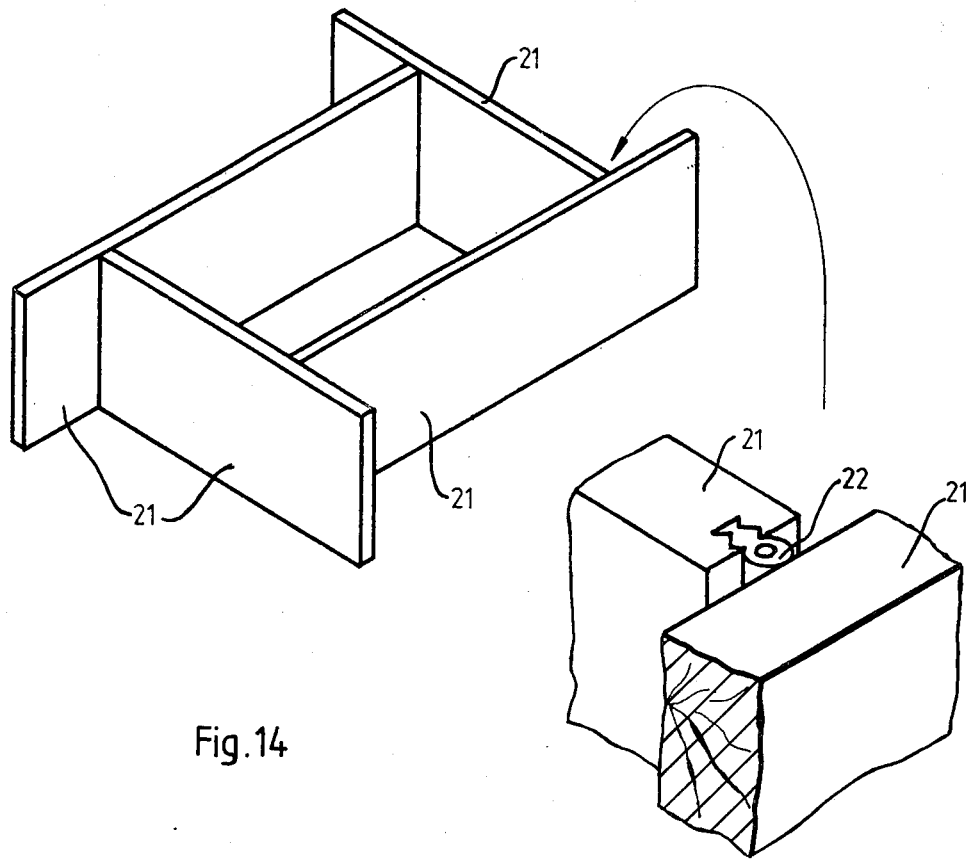
FIG. 14 shows the construction of a casting box.

FIG. 14 shows details of the construction of the said casting box. One end face of each of the individual boards 21 has a seal 22 recess into it and bears against the lateral surface of another board. The casting box for pallettes of different size can thus be assembled from various boards. Preferred materials for the boards are those that have a low adhesion to the casting materials employed in the process. It is however also possible to use parting media or anti-adhesion coatings on the said boards.

Figure 15:
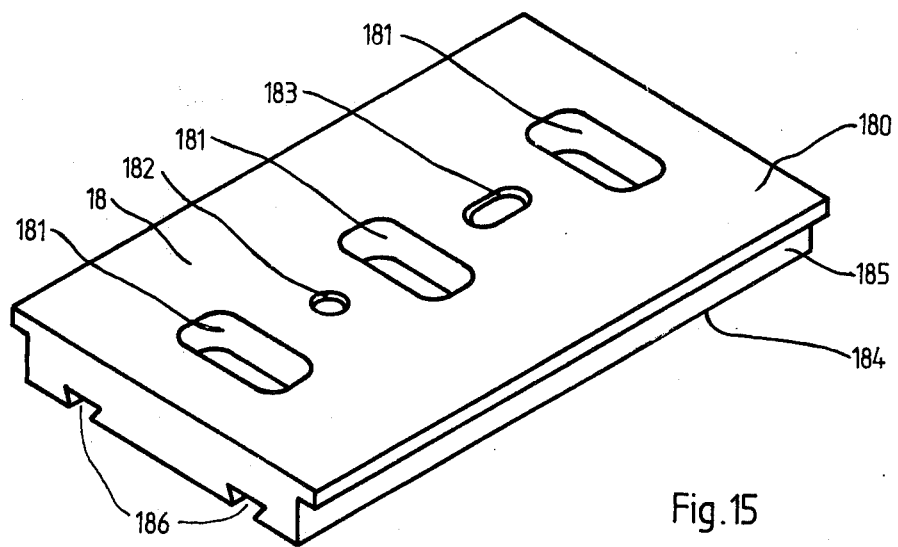
FIG. 15 shows one embodiment of a pallette.

FIG. 15 shows one kind of embodiment of the pallettes. Since the said pallettes are used together with the patterns cast thereon but more particularly are also used subsequently with the tool electrodes with different manufacturing means and are also used in the stock-removing machining operations, it follows that a substantial number of such pallettes is employed and these must therefore be appropriately constructed so that they can be produced by mechanical casting methods. In order to prevent excessive weights being handled by the operators of the devices it is preferable to use a light alloy material for producing the said pallettes. The plane machined surface 180 of the pallettes is mounted against plates 11, 12 of the device or of the other production means. A separate bore 182 is used for centring purpose and a slot 183 is utilized for defining the angular position with respect to the centring trunnion 15 on the plates 11 and 12. Flanges for mounting the pallettes 18 by means of clamping saddles 19 are provided on the longitudinal sides 185 of the pallette. The surface 184 need not be separately machined. However, it is constructed so that recess 186 are provided therein to improve retention of the casting material on the pallette and also for transmitting transverse forces which result from the abrading operation. Apart from the centring bores already mentioned the pallette is provided with at least two apertures 181, one of which functions as pouring spout and the other as the riser when the moulding compound is poured in. Several such ports can of course be provided for pallettes of substantial lengths. Pallettes of any desired length can be cast by mechanised means if such elementary moulds are serially arrowed and it is therefore appropriate to adopt a symmetrical construction for the pallette.

We claim:
1. A method of machining a tool electrode for use in electrical discharge machining, the method comprising:
 a. using a preformed model (1), of a shape which is a positive or negative replica of a shape which is to be machined by the tool electrode (6), to produce a positive casting (3) and a negative casting (2) of said shape one of the castings comprising at least on its surface (31) which defines said shape, abrasive material and bonding material which holds the abrasive material in place, and the other comprising a material which is readily machinable and which is stable as regards retaining a shape to which it is machined;

b. using the said one casting to abrade the other casting by moving the two castings together so that the positive one enters the negative one and, at the same time, applying a relative circulating but non-rotating movement, as defined herein, to the two castings whereby the said other casting assumes dimensions which deviate from what they were before;

c. making use of said other casting as thus shaped by abrasion for moulding a master mould which, at least on its surface which, allowing for the dimensional deviation, defines said shape, comprises abrasive material and bonding material which holds the abrasive material in place; and d. using said master mould (5) to abrade a workpiece from which said tool electrode (6) is to be made, and hence forming the tool electrode, by moving the master mould and the workpiece together so that one enters the other and, at the same time, applying a relative circulating but non-rotating movement, as defined herein, to the master mould and the workpiece, the amplitude of said circulating but non-rotating movement being adjusted to give predetermined dimensions of the tool eletrode in relation to those of said model.

2. A method according to claim 1, wherein said one casting is said positive casting (3) and said other casting is said negative casting (2) and wherein the step of using said abraded other casting (2') for moulding said master mould (5) is performed by using said abraded other casting (2') as a mould to make a third casting (4) of low-shrinkage material and then using said third casting (4) as a mould to make said master mould (5).

3. A method according to claim 1, wherein said readily machinable material is gypsum.

4. A method according to claim 1, in which said negative casting (2) is made by using said model (1) as a mould therefor and said positive casting (3) is made by using said negative casting (2) as a mould therefor.

5. A method according to claim 1, wherein in order to produce said positive (3a) and said negative (2a) casting, there is made a preformed model (7) which comprises a portion having a shape which is to be machined and at least one further portion hving a shape corresponding to that of an auxiliary structure which is of use in subsequent forming operations.

6. A method according to claim 1, wherein said preformed model is used to produce said negative casting (2b) thereof, and then said negative casting is machined to provide it with at least one portion having a shape corresponding to that of an auxiliary structure which is of use in subsequent machining operations.

* * * * *